UNITED STATES PATENT OFFICE.

TERRENCE McSWEENEY, OF ALLEGHENY, ASSIGNOR OF ONE-HALF TO THOMAS A. GILLESPIE, OF PITTSBURG, PENNSYLVANIA.

COMPOSITION FOR PACKING JOINTS AND OTHER PURPOSES.

SPECIFICATION forming part of Letters Patent No. 356,411, dated January 18, 1887.

Application filed October 28, 1886. Serial No. 217,414. (No specimens.)

*To all whom it may concern:*

Be it known that I, TERRENCE McSWEENEY, residing at Allegheny, in the county of Allegheny and State of Pennsylvania, a citizen of the United States, have invented or discovered certain new and useful Improvements in Compositions for Packing Joints and other Purposes, of which improvements the following is a specification.

The invention herein relates to certain improvements in compositions for packing the threaded joints of water, gas, or steam pipe sections, and also for coating or protecting such pipe-sections as against the action of water, gas, and other injurious agencies.

In preparing my improved composition, which I term "fluid gum," I take one part of rosin and four parts of mineral asphaltum, and mix them thoroughly together when melted. I then mix six parts of the compound of rosin and mineral asphaltum, while hot, with a mixture or compound composed of six parts of black wax-tailings and six parts of thick yellow wax-tailings. These wax-tailings are distillates from petroleum residuum or tar, and are well known in the art.

The above composition, when cold, has about the consistency of molasses, forms a dark, brilliant, and adhesive substance, which sets in time, becoming quite tough and elastic.

In forming joints between pipe-sections the above composition is applied, while in a fluid state, to the threads of the parts to be united, in the same manner as white or red lead is applied, and the pipe-sections are then screwed together. As there is no oil in this composition, it retains tough elastic characteristics, and does not crumble, as does lead, either white or red, when the oil therein has been absorbed by the metal. The body or consistency of the above composition is such when set that if the threads do not fit tight the composition will fill the spaces and form a tight joint.

The above composition, the proportions of which may be varied, is also applicable for coating pipes to protect the same from rust, and also to form a smooth interior surface.

I claim herein as my invention—

A composition for packing joints and other purposes, composed of rosin, mineral asphaltum, black wax-tailings, and yellow wax-tailings mixed together in the proportions and in the manner substantially as set forth.

In testimony whereof I have hereunto set my hand.

TERRENCE McSWEENEY.

Witnesses:
R. H. WHITTLESEY,
C. M. CLARKE.